US012662090B1

(12) United States Patent
Battelle

(10) Patent No.: US 12,662,090 B1
(45) Date of Patent: Jun. 23, 2026

(54) SYSTEM AND METHOD FOR A HANDHELD MULTI-USE CURVED WINDSHIELD SQUEEGEE

(71) Applicant: Andrew J. Battelle, Tucson, AZ (US)

(72) Inventor: Andrew J. Battelle, Tucson, AZ (US)

( * ) Notice: Subject to any disclaimer, the term of this patent is extended or adjusted under 35 U.S.C. 154(b) by 0 days.

(21) Appl. No.: 19/013,518

(22) Filed: Jan. 8, 2025

Related U.S. Application Data

(63) Continuation of application No. 18/500,208, filed on Nov. 2, 2023, now Pat. No. 12,227,149.

(51) Int. Cl.
B60S 3/04 (2006.01)
A47L 13/11 (2006.01)
B25G 1/08 (2006.01)

(52) U.S. Cl.
CPC .............. B60S 3/045 (2013.01); A47L 13/11 (2013.01); B25G 1/08 (2013.01)

(58) Field of Classification Search
CPC .................................. A47L 13/11; B25G 1/08
USPC .......................................................... 15/245
See application file for complete search history.

(56) References Cited

U.S. PATENT DOCUMENTS

| | | | |
|---|---|---|---|
| 1,838,158 | A | 12/1931 | Schwartz |
| 2,896,241 | A | 7/1959 | Cotman |
| 3,526,928 | A | 9/1970 | Vaessen |
| 3,789,451 | A | 2/1974 | Laitner |
| 4,025,983 | A | 5/1977 | Schlegel |

| | | | | |
|---|---|---|---|---|
| 4,716,616 | A | * | 1/1988 | Poon ........................ A47L 13/11 |
| | | | | 15/245 |
| 4,742,595 | A | | 5/1988 | Isaacs |
| 5,349,716 | A | | 9/1994 | Millar |
| 6,092,255 | A | * | 7/2000 | Kim .......................... A47L 1/06 |
| | | | | 15/245 |
| 6,990,705 | B1 | | 1/2006 | Schouten et al. |
| D634,496 | S | | 3/2011 | Porco |
| 11,136,004 | B2 | | 10/2021 | Cormier |
| D955,755 | S | | 6/2022 | Wang |
| D959,079 | S | | 7/2022 | Williams, Jr. |

(Continued)

FOREIGN PATENT DOCUMENTS

| | | | |
|---|---|---|---|
| CA | 1257955 A | 8/1989 | |
| DE | 202009016891 U1 * | 3/2010 | ............. A47L 13/16 |

(Continued)

OTHER PUBLICATIONS

International Search Report for international application No. PCT/US23/78936 mailing date Apr. 9, 2024.

(Continued)

*Primary Examiner* — Katina N. Henson

(74) *Attorney, Agent, or Firm* — Bold IP, PLLC; Christopher Mayle

(57) ABSTRACT

A system and method for curved squeegee apparatus that is usable in a variety of different configurations whereby the apparatus has a squeegee blade, a handle that acts as a cover to the squeegee blade and allows for the squeegee blade to reach extended locations in a parallel orientation with the handle and clean specific areas in a perpendicular position with respect to the handle, and a squeegee channel which has a curved shape causing the blade to have a convex or concave shape when inserted into the squeegee channel allowing the curved squeegee apparatus to accommodate for different surface areas.

4 Claims, 7 Drawing Sheets

(56)       References Cited

U.S. PATENT DOCUMENTS

| | | | |
|---|---|---|---|
| 2002/0071710 A1* | 6/2002 | Vito | ................... B05B 11/0005 |
| | | | 401/266 |
| 2006/0254009 A1 | 11/2006 | Tsai et al. | |
| 2006/0277708 A1 | 12/2006 | Kim | |
| 2007/0044264 A1* | 3/2007 | Argo | ....................... A47L 13/11 |
| | | | 15/245 |
| 2012/0016429 A1 | 1/2012 | Klorg | |
| 2021/0016429 A1* | 1/2021 | Savard | ...................... A47L 1/06 |
| 2022/0379451 A1 | 12/2022 | Bousquet | |

FOREIGN PATENT DOCUMENTS

| | | |
|---|---|---|
| EP | 3569130 A1 | 11/2019 |
| WO | 9808458 | 3/1998 |

OTHER PUBLICATIONS

Written Opinion of the International Searching Authority for international application No. PCT/US23/78936, mailing date Apr. 9, 2024.

Foldaway Squeegee, simplehuman.com. https://www.simplehuman.com/products/squeegee-foldaway [Date accessed: Sep. 11, 2023].

Foldable Portable Squeegee, hannamanufacturing.com. https://hannahmanufacturing.com/product/foldable-portable-squeegee/ [Date accessed: Sep. 11, 2023].

\* cited by examiner

124

122

SYSTEM AND METHOD FOR A HANDHELD MULTI-USE CURVED WINDSHIELD SQUEEGEE

CROSS REFERENCE TO RELATED APPLICATIONS

This application claims priority to U.S. patent application Ser. No. 18/500,208 filed on Nov. 2, 2023.

FIELD OF DISCLOSURE

The overall invention relates generally to squeegees and more particularly a squeegee designed for a wide range of curvatures of surfaces whereby the handle doubles as a blade cover.

BACKGROUND

A squeegee is a handheld cleaning tool used for cleaning and drying flat surfaces, to remove liquid, dirt, or debris from a surface, leaving it clean and streak-free. Squeegees are primarily designed for use on smooth, flat surfaces like glass but may not be as effective on textured or irregular surfaces. The rubber or silicone blade on a squeegee can also wear out over time, losing its effectiveness and potentially leaving behind streaks or not removing water and debris effectively. Squeegees also have limited reach making it difficult to clean large or high windows without the use of additional equipment like extension poles. Storing squeegees can be challenging due to their shape and size. Because of these setbacks a need for an improved curved squeegee system.

SUMMARY

The present invention is directed to a handheld multi-use curved windshield squeegee that removes all the water as it is slightly curved and the rubber is allowed to be flexible and form to the windshield. It is allowed to be flexible because the sides of the channel (slot that the rubber blade slides into) has shorter walls, therefore providing less support, which advantageously allows the rubber blade to move more freely. The handheld multi-use curved windshield squeegee may have a rubber blade inserted into a squeegee channel with a sheath or cover that slides over the rubber blade for protection and doubles as a handle by connecting a notch cut out on one end of the sheath to a corresponding shape on the top-center edge of the side opposite of the open squeegee channel and rubber blade. The cut-out may be at a 35-degree angle or any suitable acute angle for the handle to lock in place for ergonomic use.

The squeegee channel may have a shallow positioning (to maximize protrusion of the rubber blade for greater conformity to shapes), a curve/radius, and a central area that is 3 mm higher than its ends to provide curvature. The groove in the channel has a specific arc/curve to allow the channel to make contact throughout the rubber blade and to conform to curved and flat surfaces. The channel curvature also constricts the rubber blade from sliding during use or storage but allows for removal and replacement. The positioning of the groove in the channel is the key to prevent the rubber blade from becoming too stiff or flexible while in use.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

In the following detailed description, numerous specific details are set forth in order to provide a more thorough understanding of the one or more embodiments described herein. However, it will be apparent to one of ordinary skills in the art that the invention may be practiced without these specific details. In other instances, well-known features have not been described in detail to avoid unnecessarily complicating the description.

The present invention is directed to a system and method for a curved squeegee handheld apparatus 100 that is usable in a variety of different configurations. Curved squeegee handheld apparatus 100 may also have a squeegee channel which has a curved shape causing the squeegee blade to have a convex or concave shape when inserted into the squeegee channel allowing the curved squeegee apparatus to accommodate for different surface areas. Curved squeegee handheld apparatus 100 may have a handle that acts a cover for the squeegee blade when inserted into the squeegee channel and allows for the squeegee blade to reach extended locations in a parallel orientation with the handle and clean other types of areas in a perpendicular position with respect to the handle using a customized notch cut at the end of the handle.

Figure 1:
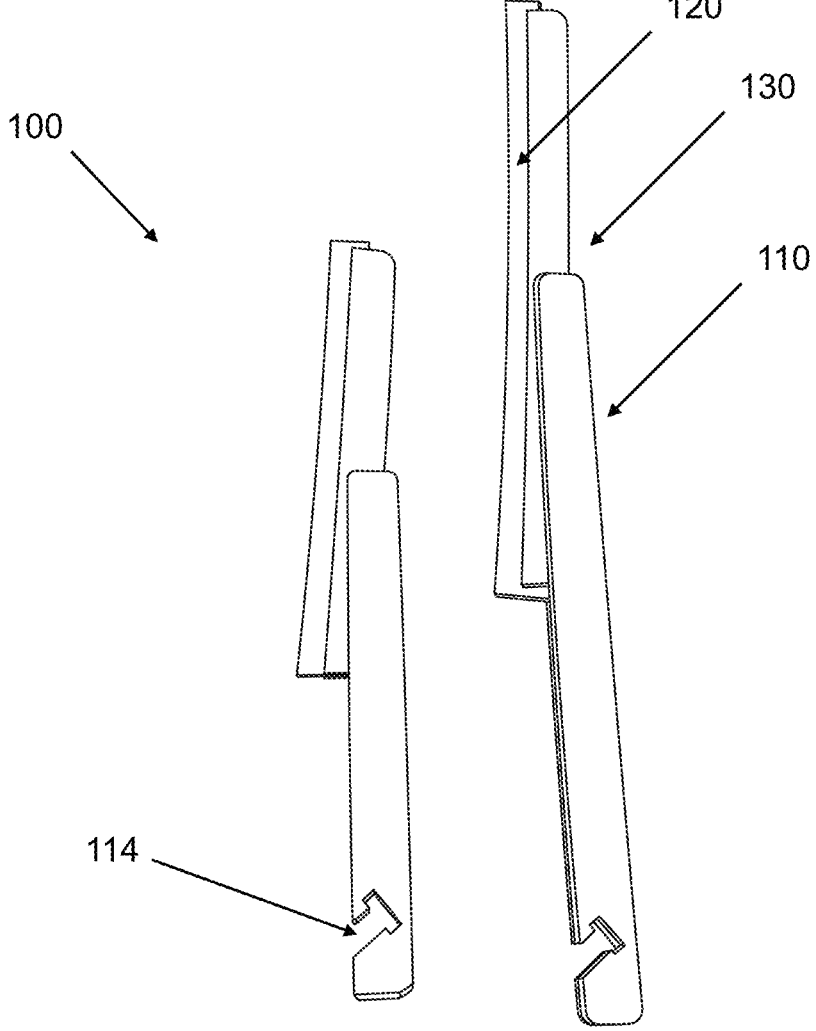
FIG. 1 shows an illustration of a first embodiment of the curved squeegee handheld apparatus in a first orientation and in an extended parallel orientation.

One embodiment of a curved squeegee handheld apparatus 100 in accordance with the present invention is illustrated in FIG. 1. Curved squeegee handheld apparatus 100 may include three components such as handle 110, squeegee blade 120, and squeegee channel 130.

Squeegee blade 120 may be made of rubber or silicone, and it is the part of curved squeegee handheld apparatus 100 that comes into contact with the surface being cleaned. Squeegee blade 120 may be designed to conform to the shape of the surface and efficiently remove liquid or dirt as it is pulled across the surface. Squeegee blade 120 is designed to be replaceable, so when it becomes too worn out, a new one may be purchased.

Figure 6:
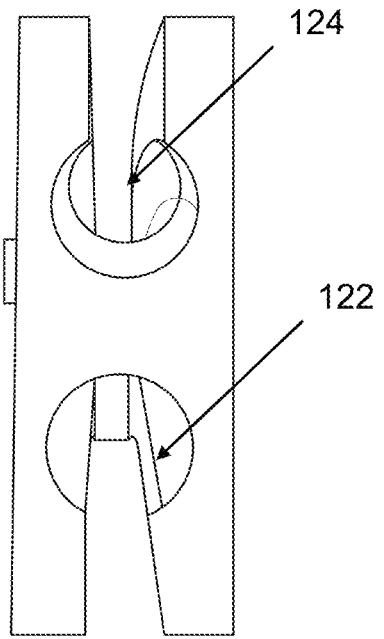
FIG. 6 shows an illustration of the squeegee channel of curved squeegee handheld apparatus.
Figure 7:
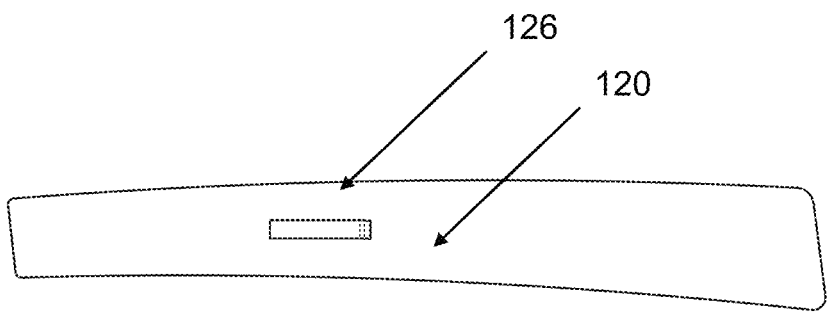
FIG. 7 shows another illustration of the squeegee channel of curved squeegee handheld apparatus.

Squeegee channel 130, as illustrated in FIGS. 6 and 7 may act as a squeegee holder and be elongated in shape with straight or rounded edges whereby it curves over its length such that the middle is 3 mm higher than its ends to provide said curvature. Squeegee channel 130 may be made of a high strength chemical resistant plastic or any suitable material that does not stray away from the intent of the present invention. This part is slightly curved so that when squeegee blade 120 is inserted, squeegee blade 120 is now curved with it, having taken the shape of the curve.

Squeegee channel 130 may have a slot 122 extending inward from a bottom surface of squeegee channel 130 and a slot 124 extending inward from a top surface of squeegee channel 130 whereby slots 122 and 124 are similarly shaped and mirroring one another, as illustrated in FIG. 6. Slots 122 and 124 may have a rectangular portion closest to the top and bottom surfaces of squeegee channel 130 whereby the rectangular portion extends inward to a circular portion that is closer to the middle of squeegee channel 130.

The positioning of slots 122 and 124 allow for a squeegee blade 120 that is inserted into squeegee channel 130 to be oriented as a convex outer surface or concave inner surface. The arc of squeegee channel 130 also constricts squeegee blade 120 from sliding in or out of slot 122 or 124. A user may pull squeegee blade 120 through slot 122 or 124 to remove and replace squeegee blade 120, but squeegee blade 120 will not slide out during use or storage. Squeegee channel 130 may have one or more protrusions 126 on both sides of squeegee channel 130 that extend outward perpendicularly at or near a middle of squeegee channel 130, as illustrated in FIG. 7.

Figure 2:
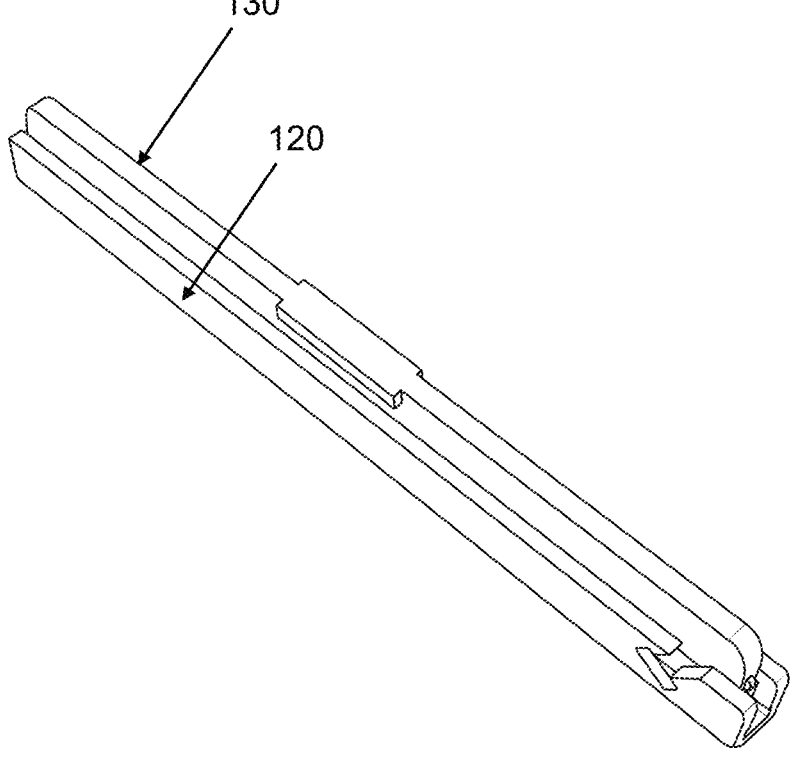
FIG. 2 shows an illustration of a first embodiment of the curved squeegee handheld apparatus in a stored orientation.
Figure 3:
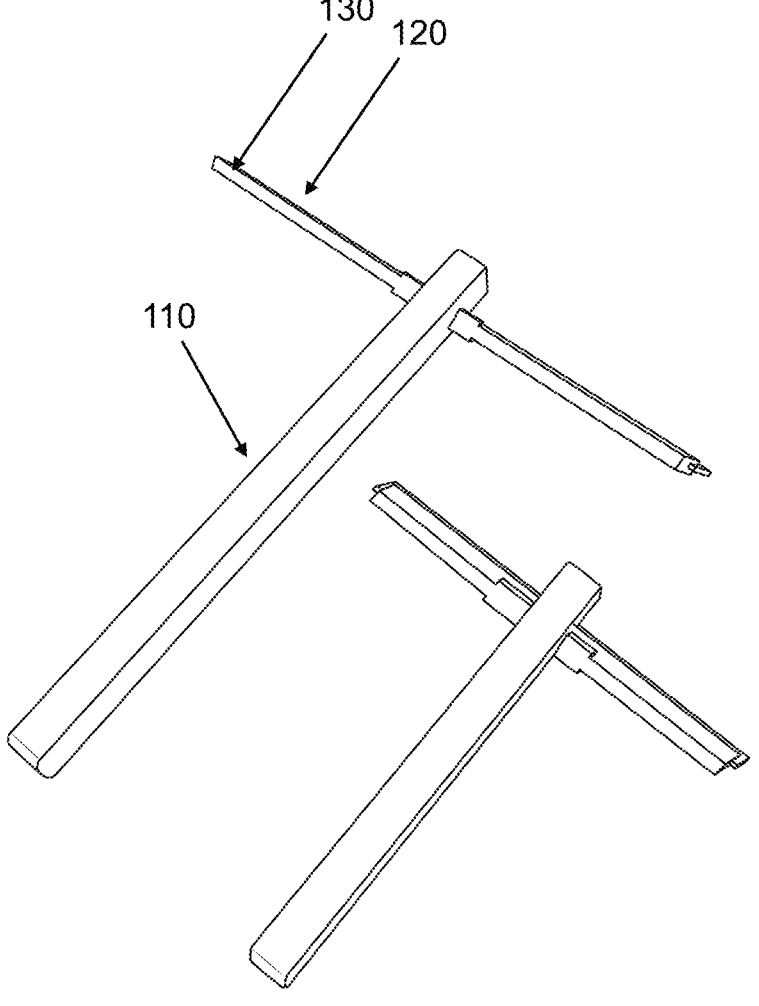
FIG. 3 shows an illustration of a first embodiment of the curved squeegee handheld apparatus in a perpendicular orientation.
Figure 4:
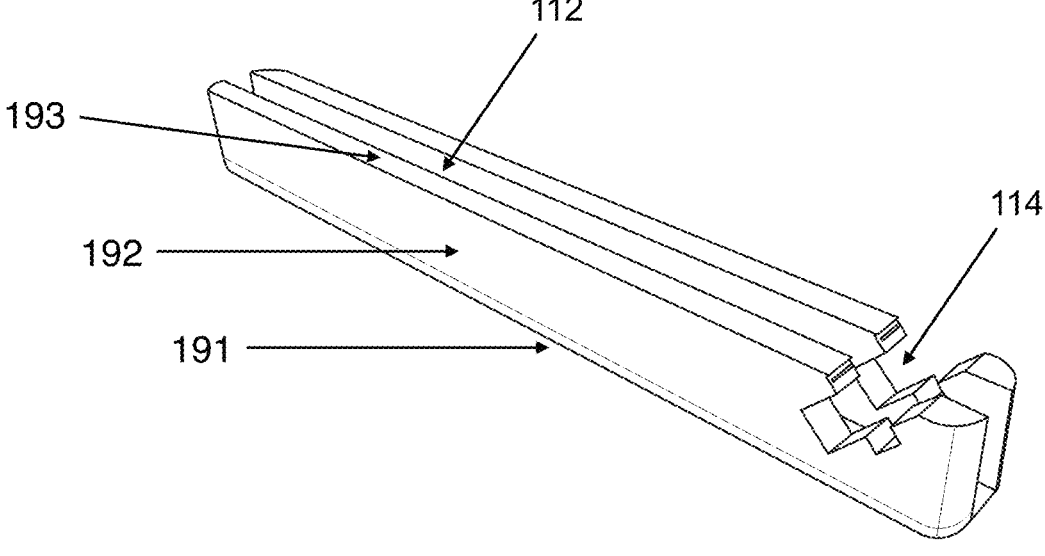
FIG. 4 shows an illustration of the handle of curved squeegee handheld apparatus.

Handle 110, as illustrated in FIG. 4 may provide a grip for the user and allows them to apply pressure and control the movement of squeegee blade 120 and doubling as a squeegee sheath or cover when squeegee channel 130 with inserted squeegee blade 120 are positioned inside a sliding channel of handle 110. Handle 110 may be attached perpendicular to squeegee channel 130, as illustrated in FIG. 3 with the difference being that a user may also remove squeegee channel 130 and attach squeegee channel 130 in a parallel configuration inside handle 110 for extended reach of the squeegee blade, as illustrated in FIG. 1. The handle also slides over the squeegee blade and protects the rubber while not in use, as illustrated in FIG. 2.

Handle 110 may be made of a high strength chemical resistant plastic or any other suitable material that does not stray away from the intent of the present invention. Handle 110 may come in various shapes and sizes to accommodate different preferences and applications. Handle 110 may be elongated in shape with rounded edges. Handle 110 may have a base surface whereby each of the side edges of the base surface extend upward into two sidewalls. Each of the two groups of two sidewalls are connected by a top surface forming an open cavity acting as a sliding channel 112 to receive squeegee channel 130 and protect squeegee blade 120. Handle 110 may also have one or more grooves or designs to hold squeegee channel 130 at specific locations for a designated needed height.

Figure 5:
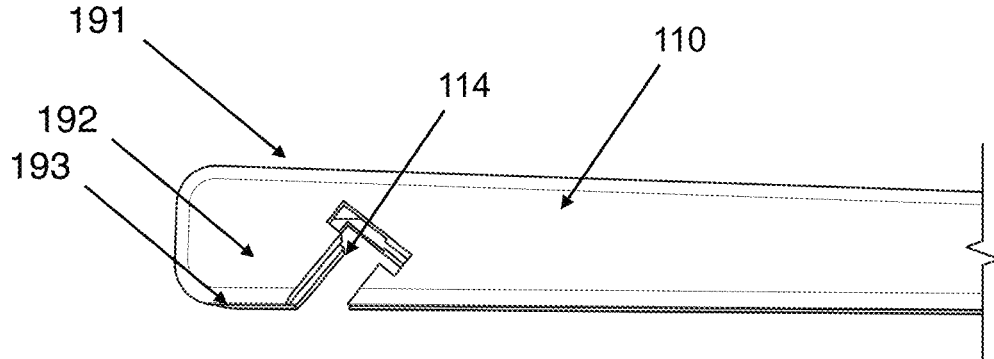
FIG. 5 shows another illustration of the handle of curved squeegee handheld apparatus.

Sliding channel 112 may be in the form of a U-shape or T-shape, as illustrated in FIG. 4. Sliding channel 112 may have two ends, and at least one of the ends is an open end. Preferably, the two ends of the sliding channel 112 are open ends. Handle 110 may have a "T" shaped notch cut out on one end of handle 110 that extends diagonally outward from sliding channel 112 towards the end, as illustrated in FIGS. 4 and 5. In one or more embodiments, the angle of notch cut 114 may be at a 35 degree angle, however, this is non-limiting and may be any suitable angle depending on the circumstances needed for curved squeegee handheld apparatus 100. The protrusions of squeegee channel 130 permit squeegee channel 130 to match the shape of notch cut 114 of handle 110, as illustrated in FIG. 3. This fit is slightly snug and allows handle 110 to be used as a handle with squeegee blade 120 now in perpendicular position.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A squeegee apparatus comprising: a handle having a longitudinal sliding channel forming open ends on opposing sides of the handle and a notch at one end; a squeegee holder; and a separate removable flexible squeegee blade, wherein a first blade receiving slot is formed within and extending into a body of the squeegee holder from a first surface thereof, a second blade receiving slot formed within and extending into the body of the squeegee holder from a second surface thereof opposite the first surface, wherein the first blade receiving slot and second blade receiving slot are configured to alternatively receive and retain a squeegee blade therein, wherein the squeegee blade forms a convex curve in the first blade receiving slot and forms a concave curve in the second blade receiving slot.

2. The squeegee apparatus of claim 1, wherein the squeegee blade is configured to be selectively inserted into and retained within either the first blade receiving slot or the second blade receiving slot of the squeegee holder.

3. A cleaning apparatus comprising: a handle with a channel having open ends on opposing sides of the handle; a cleaning member; and a holder for the cleaning member; wherein the holder is selectably attachable to the handle in at least: a first orientation wherein the cleaning member is protected by the handle; a second orientation wherein the cleaning member extends parallel to the handle past one of the open ends; and a third orientation wherein the cleaning member extends at an angle to the handle, wherein the holder has a first slot and a second slot to receive the cleaning member, wherein the cleaning member is insertable into the first slot to form a convex cleaning surface when the holder curves away from the cleaning surface or insertable into the second slot to form a concave cleaning surface when the holder curves toward the cleaning surface.

4. A squeegee apparatus comprising:

a handle having a sliding channel formed integrally within the handle and extending along a longitudinal axis of the handle and a fixed notch formed integrally in the handle at one end thereof, the notch extending at an angle from the sliding channel wherein the notch provides a fixed angular position;

a squeegee holder completely separable from the handle and insertable into the sliding channel of the handle; and a flexible squeegee blade removably mounted to the squeegee holder.

\* \* \* \* \*